(12) United States Patent  (10) Patent No.: US 7,482,572 B1
Galvin  (45) Date of Patent: Jan. 27, 2009

(54) TRANSMISSIVE DIFFUSER WITH A LAYER OF POLYTETRAFLUOROETHYLENE ON THE OUTPUT SURFACE FOR USE WITH AN ON-ORBIT RADIOMETRIC CALIBRATION

(75) Inventor: Roy P. Galvin, Leo, IN (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 302 days.

(21) Appl. No.: 11/188,372

(22) Filed: Jul. 25, 2005

(51) Int. Cl.
H01J 3/14 (2006.01)
H01J 5/16 (2006.01)
H01J 40/14 (2006.01)

(52) U.S. Cl. .................... 250/216; 250/203.4; 359/599; 359/707

(58) Field of Classification Search ................ 250/216, 250/203.4; 359/599, 707; 396/375, 374, 396/385; 348/340, 342; 428/411.1, 424.8, 428/421
See application file for complete search history.

(56) References Cited

U.S. PATENT DOCUMENTS

| 2,381,542 | A | * | 8/1945 | Hyatt et al. .................. 442/148 |
| 4,126,383 | A | * | 11/1978 | Doriguzzi et al. ............. 349/68 |
| 4,152,618 | A | * | 5/1979 | Abe et al. .................... 313/116 |
| 5,659,168 | A | * | 8/1997 | Dey et al. ................. 250/208.1 |
| 5,670,774 | A | * | 9/1997 | Hill .......................... 250/203.4 |
| 5,781,342 | A | * | 7/1998 | Hannon et al. .............. 359/599 |
| 5,835,267 | A |   | 11/1998 | Mason et al. |
| 5,861,947 | A | * | 1/1999 | Neumann .................... 356/216 |
| 7,166,825 | B1 | * | 1/2007 | Smith et al. .............. 250/230.4 |

FOREIGN PATENT DOCUMENTS

JP 2001055646 A * 2/2001
JP 2005024942 A * 1/2005

* cited by examiner

*Primary Examiner*—Thanh X Luu
*Assistant Examiner*—Francis M Legasse, Jr.
(74) *Attorney, Agent, or Firm*—Ratner Prestia

(57) ABSTRACT

A flux diffuser for radiometrically calibrating an imaging sensor using the sun as a calibration light source, the flux diffuser including a fiberglass cloth having input and output surfaces. The input surface receives solar irradiance, and the output surface provides diffused scattered light to a radiometer. A layer of mylar may be disposed on top of the input surface. A layer of PTFE or Spectralon™ may be disposed on top of the output surface, and another layer of mylar may be disposed on top of the layer of PTFE or Spectralon™.

16 Claims, 4 Drawing Sheets

TRANSMISSIVE DIFFUSER WITH A LAYER OF POLYTETRAFLUOROETHYLENE ON THE OUTPUT SURFACE FOR USE WITH AN ON-ORBIT RADIOMETRIC CALIBRATION

TECHNICAL FIELD

The present invention relates, in general, to the field of radiometry and, more specifically, to a system and method for radiometric calibration of remote sensors in space employing solar radiation as a source of radiation.

BACKGROUND OF THE INVENTION

Planetary imagers are useful for remote sensing of atmospheric compositions, crop assessments, weather prediction and other types of monitoring activities. Monochromatic and multispectral satellite-based, remote sensors are able to measure properties of the atmosphere above the earth, when their detector arrays are properly calibrated for radiometric response.

A method of calibrating the radiance measured by these remote sensors is to create a reference radiation using a known source of spectral irradiance, such as the sun. The radiation from the sun may be used as a reference signal to a diffusive reflector which, in turn, may provide a known radiance to a remote sensor for calibrating its detector arrays.

The output of the detector arrays may be measured as the remote sensor receives the known diffusely reflected energy from the diffusive reflector. This radiance calibration method provides sufficient information to correctly measure and calculate other types of radiance incident on the remote sensor during normal operation, when using the output of the remote sensor, as the remote sensor views the earth or other target of interest.

The spectral reflectance characteristics of the diffusive reflector, or diffuser panel, however, may change with time due to degradation of the diffuser panel. Since the diffuser panel is employed as the reference source, any change, i.e., degradation of the diffusive surface material, results in a distortion in the measurements of the remote sensor.

Currently, a common diffuser used in on-orbit radiometric calibration is reflective in nature. Typically, such diffuser is made from PTFE or Spectralon™. The PTFE is a pressed polytetrafluoroethylene material. The PTFE, for example, may be sold under the trade name of Algoflon®, which is manufactured by Solvay Solexis of Thorofare, N.J. Another type of material used for a diffusive surface is a thermoplastic resin material sold under the trade name of Spectralon™, manufactured by Labsphere of North Sutton, N.H. An integrating sphere lined with the PTFE or Spectralon™, or lined with barium sulfite ($BaSO_4$) may also be used as a diffuser.

The aforementioned diffusers are of the reflective type. There are also transmissive diffusers. Transmissive diffusers may be made from ground or frosted glass; they may also be made from opal glass or small particulate scatterers placed in a transparent matrix. Transmissive diffusers may also be made from screens or pinhole arrays. Still another type of diffuser may be a diffractive diffuser, such as diffractive scatterers formed from micro-lens arrays or holographic material.

All reflective diffusers have disadvantages. One such disadvantage is that reflective diffusers must have a view of the sun at a limited angle, so that the reflected light from the diffuser is seen by the remote sensor. At very high incidence, or exit angle, a reflective diffuser becomes difficult to characterize. Materials, such as $BaSO_4$, are brittle or fragile, which increases the probability of failure due to rocket launch vibrations.

Transmissive diffusers also have disadvantages. For example, ground or frosted glass has a limited spectral range. In addition, this glass is limited to output angles over which the sunlight scatter may occur. Ground or frosted glass also has a tendency to be heavy and fragile, resulting in drawbacks for on-orbit use due to rocket launch vibration risks. Similarly, opal glass or small particulate scatterers in a transparent matrix have a limited spectral range, due to particulate or inclusion size distribution. Since opal is glass, it also tends to be heavy and fragile, resulting in a drawback for on-orbit use, due to launch vibration risk.

Screens or pinhole arrays also have disadvantages, because their regular geometries may cause undesired diffraction effects. Screens are also difficult to calibrate over ranges of angles, due to the three-dimensional nature of the screens, which may cause internal shadowing. Furthermore, pinholes are subject to clogging from extraneous minute particles. Finally, diffractive scattering material, such as micro-lens arrays or holographic diffusers, have deficiencies in that they have a limited spectral range and a limited range of output angles over which the scatter may occur. Since they are made from glass, they tend to be heavy and fragile, resulting in drawbacks for on-orbit use, due to launch vibration risks.

The present invention solves the above disadvantages, by providing a unique transmissive diffuser, as will be described, for on-orbit radiometric calibration.

SUMMARY OF THE INVENTION

To meet this and other needs, and in view of its purposes, the present invention provides a flux diffuser for radiometrically calibrating an imaging sensor using the sun as a calibration light source. The flux diffuser comprises a fiberglass cloth including input and output surfaces. The input surface receives solar irradiance, and the output surface provides diffused scattered light to a radiometer.

An aspect of the invention includes a layer of mylar disposed on top of the input surface. Another aspect of the invention includes a layer of mylar disposed on top of the output surface.

Yet another aspect of the invention includes a layer of PTFE or Spectralon™ disposed on top of the output surface.

Still another aspect includes a layer of mylar disposed on top of the input surface, a layer of PTFE or Spectralon™ disposed on top of the output surface, and another layer of mylar disposed on top of the layer of PTFE or Spectralon™.

The fiberglass cloth is supported by a clear substrate. The fiberglass cloth may be supported by wires, or by opposing tension rollers cooperating to support the fiberglass cloth.

The fiberglass cloth includes fiber that is regularly woven or randomly woven.

A further embodiment includes an optical system for calibrating an imaging sensor array using the sun as a calibration light source comprising a port for viewing sunlight; an imaging sensor array for imaging a scene; and a flux diffuser, located between the port and the imaging sensor array, for illuminating the imaging sensor array with diffused sunlight. The flux diffuser includes a fiberglass cloth including input and output surfaces, where the input surface receives sunlight, and the output surface provides diffused scattered light to the imaging sensor array for radiometric calibration.

The mylar may be pressed onto respective surfaces of the fiberglass cloth for providing protective layers, and the layer of PTFE or Spectralon™ may be a thin layer of powder for binding the fiberglass cloth.

Another embodiment of the invention is a method of calibrating an imaging sensor array using the sun as a calibration light source in an optical system. The method includes the steps of: (a) receiving sunlight by an input surface of a fiberglass cloth; (b) diffusing the received sunlight; and (c) outputting the diffused sunlight, from an output surface of the fiberglass cloth, to the imaging sensor array for radiometric calibration.

An aspect of the method includes the step of protecting the input surface of the fiberglass cloth by adding a layer of mylar onto the fiberglass cloth.

Another aspect of the method includes the step of binding the fiberglass cloth by adding a layer of PTFE or Spectralon™ onto the fiberglass cloth.

It is to be understood that both the foregoing general description and the following detailed description are exemplary, but are not restrictive, of the invention.

BRIEF DESCRIPTION OF THE DRAWING

The invention is best understood from the following detailed description when read in connection with the accompanying drawing. Included in the drawing are the following figures.

DETAILED DESCRIPTION OF THE INVENTION

The present invention provides a unique transmissive diffuser for on-orbit radiometric calibration. In general, a transmissive diffuser may use solar angles that are unavailable to a reflective diffuser. A transmissive diffuser, furthermore, may be made from lightweight, low outgassing, none brittle, radiation stable material that lowers risk of device failure prior to satellite launch and after satellite launch. Moreover, the materials used for the transmissive diffuser includes material already approved for the space environment.

Figure 1A:
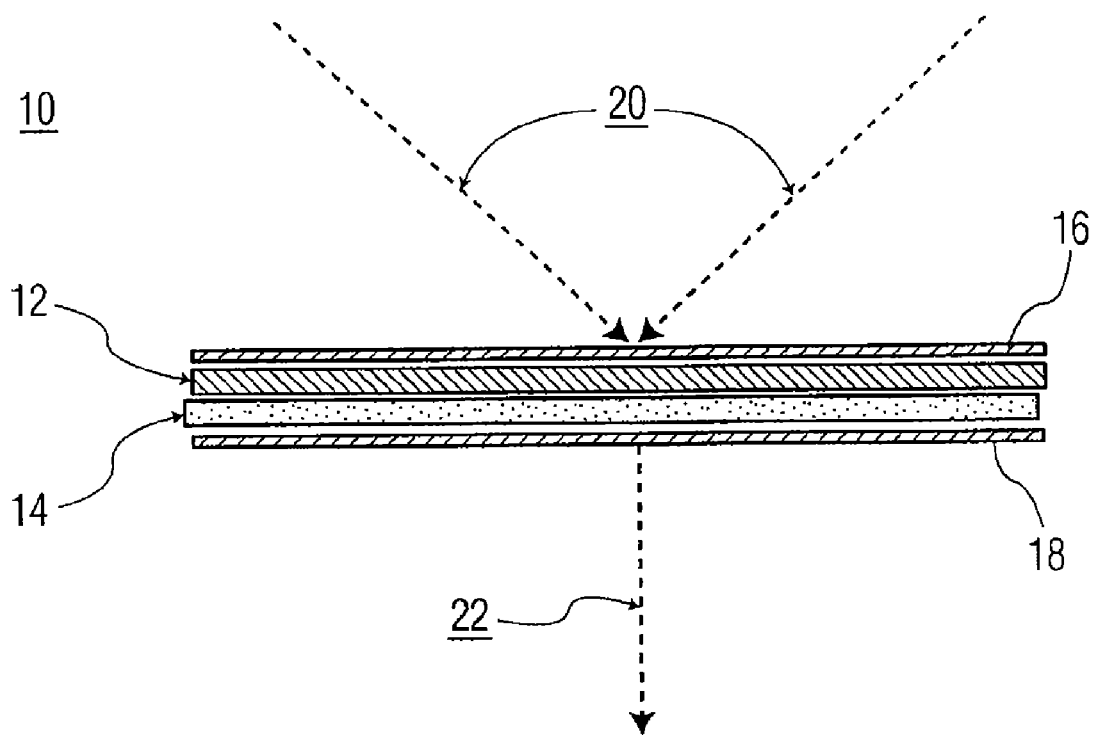
FIGS. 1A and 1B are side views of a transmissive diffuser for radiometric calibration, in accordance with different embodiments of the present invention.

Referring first to FIG. 1A, there is shown a transmissive diffuser, generally designated as 10. As shown, the transmissive diffuser of the present invention includes a thin fiberglass cloth, generally designated as 12. In the exemplary embodiment shown in FIG. 1A, fiberglass cloth 12 is sandwiched between a first layer of mylar, generally designated as 16, and a thin layer of PTFE/Spectralon™ material, generally designated as 14. Also shown is a second layer of mylar, generally designated as 18.

It will be appreciated that the present invention may operate with a single layer of fiberglass cloth 12 and no other layers. Fiberglass cloth 12 is effective in receiving solar irradiance 20, diffusing the solar irradiance, and providing a diffused scattered light output 22 to a radiometer (not shown). The solar irradiance may be received from a wide range of sun angles.

Figure 1B:
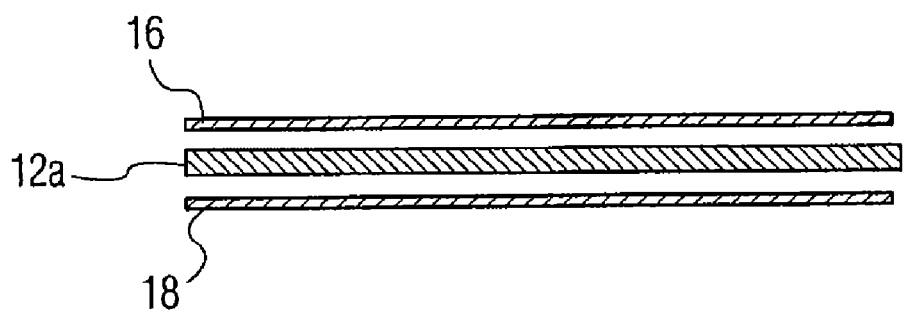

In another embodiment of the present invention, fiberglass cloth 12 may include a layer of PTFE/Spectralon™ 14, as shown in FIG. 1A, without first or second mylar layers 16 and 18. It will be appreciated that the PTFE/Spectralon™ layer may be used as an optional thin layer, or as a powder for binding fiberglass cloth 12. Accordingly, layer 14 may actually be part of layer 12, in which the PTFE is embedded into fiberglass cloth 12. An embodiment in which the PTFE is embedded/impregnated into a fiberglass matrix is shown in FIG. 1B, and is generally designated as 12a.

In yet another embodiment of the present invention, fiberglass cloth 12 and PTFE/Spectralon™ layer 14 may be sandwiched between first mylar layer 16 and second mylar layer 18. It will be appreciated that first and second mylar layers 16 and 18 may be used as a sealer to protect the fiberglass cloth. The mylar layers may be pressed, possibly hot pressed, into fiberglass cloth 12 and/or PTFE/Spectralon™ layer 14.

It will be understood that wherever PTFE is used herein it may be either powder, pressed powder, a thin sheet, or PTFE embedded in fiberglass. PTFE embedded/impregnated into a fiberglass matrix may be obtained, for example, from the following supplier: Sheldahl (supplier of Beta cloth), 1150 Sheldahl Road, Northfield, Minn., 55057, 507-663-8000, Fax 507-663-8545. This is a space qualified product called Beta cloth which is typically aluminized and used for spacecraft thermal control surfaces, but it may be obtained without the aluminization layer.

Figure 2:
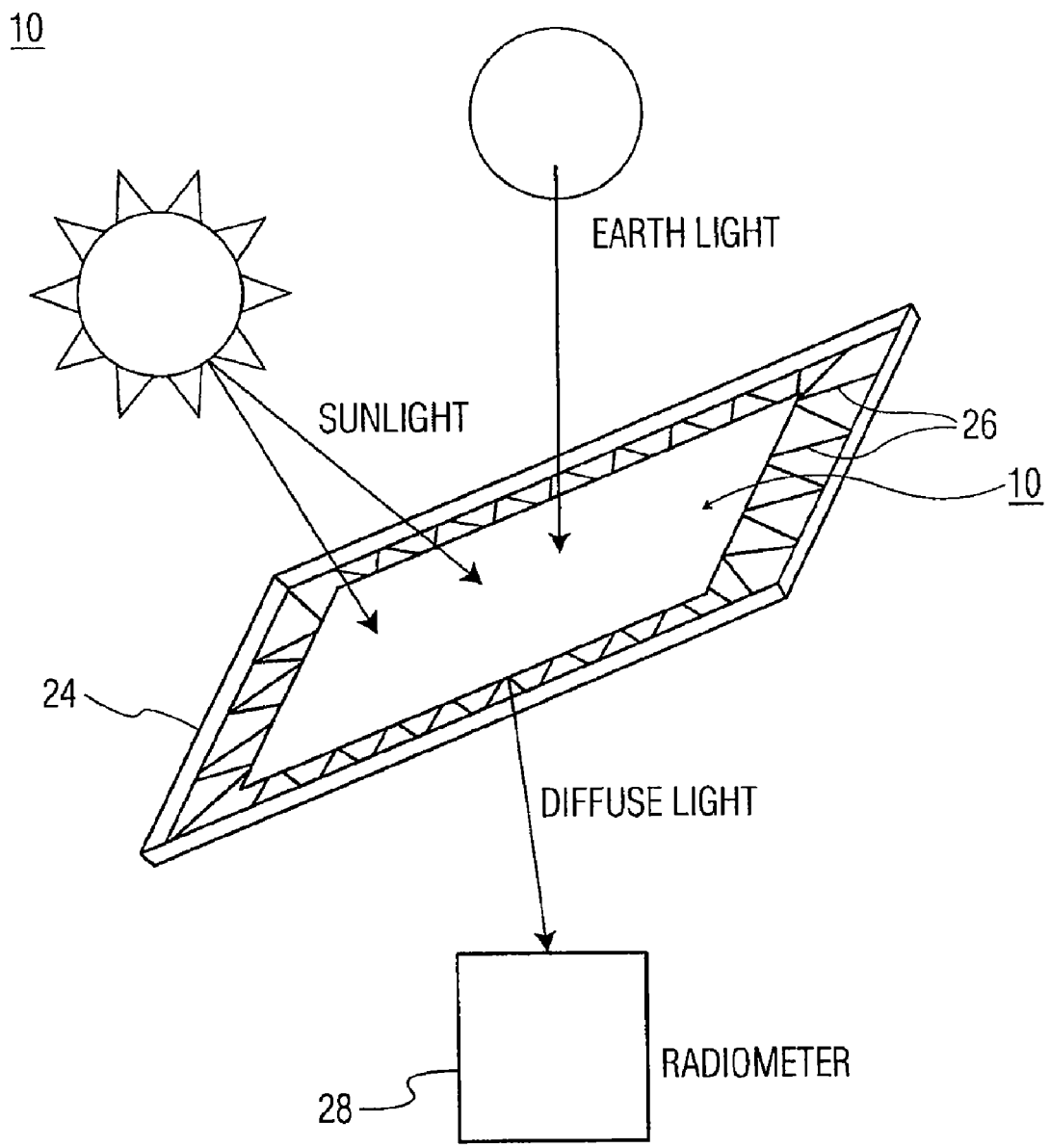
FIG. 2 is a schematic representation of the transmissive diffuser employed in FIGS. 1A and 1B receiving irradiance from the sun, or the earth, and providing diffused output light to a radiometer for calibration purposes, in accordance with an embodiment of the present invention.

Referring next to FIG. 2, there is shown transmissive diffuser 10 in operation. As shown schematically, transmissive diffuser 10 is placed in front of radiometer 28 (or remote imaging sensor 28), so that sunlight or earth light, or any other light, may be diffused and transmitted as diffused light onto radiometer 28. In operation, transmissive diffuser 10 changes collimated sunlight into a diffused illumination source for viewing by radiometer 28.

Figure 3A:
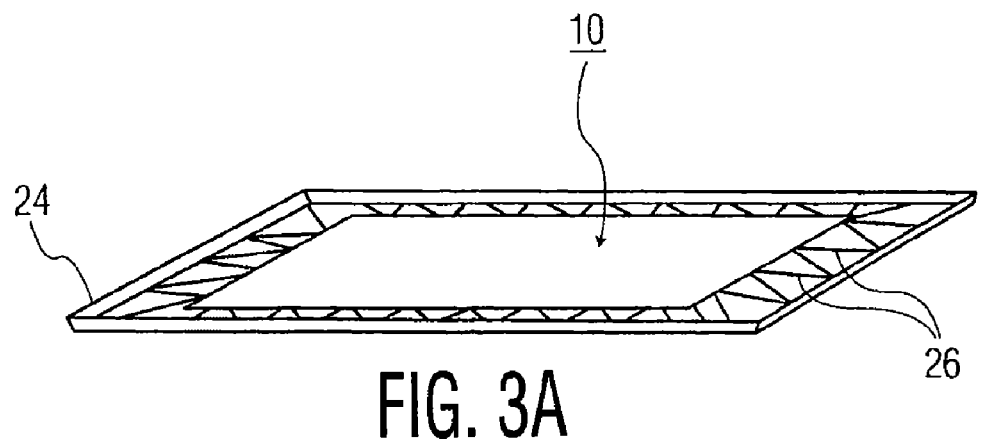
FIG. 3A is a schematic representation showing a method of mounting the transmissive diffuser employed in FIGS. 1A and 1B.
Figure 3B:
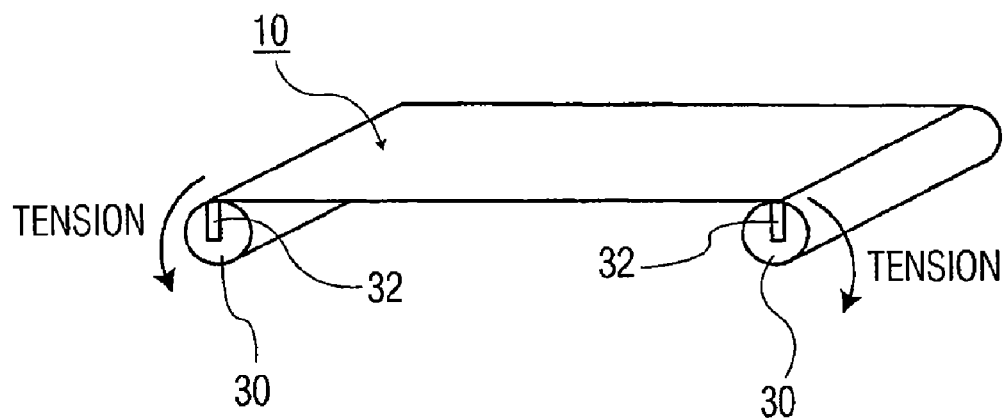
FIG. 3B is a schematic representation showing an alternative method of mounting the transmissive diffuser employed in FIGS. 1A and 1B.

Referring next to FIGS. 3A and 3B, there are shown two different implementations for supporting transmissive diffuser 10, so that it is disposed between the received solar irradiance and the input to the radiometer. As shown in FIG. 3A, transmissive diffuser 10 is supported by wires 26 that are attached to rectangular (or any other geometry) frame 24. Tension to maintain transmissive diffuser 10 in a flat configuration may be achieved by sewing the ends of the fiberglass cloth of transmissive diffuser 10 onto stabilizing frame 24.

Alternatively, as shown in FIG. 3B, transmissive diffuser 10 may be maintained in a flat configuration by clamping ends of transmissive diffuser 10 directly onto rods 30, or into slots 32 formed in rods 30. The rods may be mounted with tortional springs, in order to maintain transmissive diffuser 10 under tension.

Figure 4:
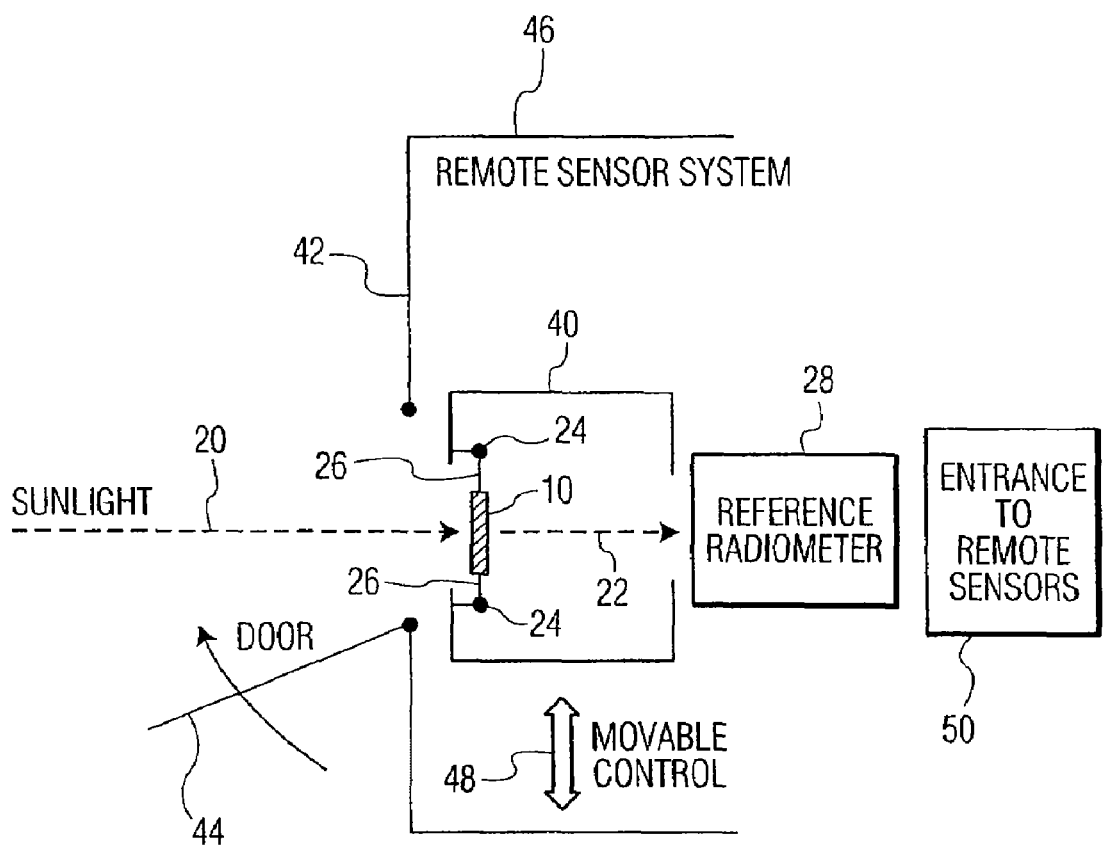
FIG. 4 is a schematic diagram of an earth imaging system employing a radiometric calibration assembly, according to an embodiment of the present invention.

Referring to FIG. 4, there is shown another embodiment of the present invention. As shown, earth imaging system 46 is located above the surface of the earth and is pointed generally toward the earth to collect information by way of entrance 50, leading to remote sensors. In order to calibrate earth imaging system 46, a radiometric calibration assembly, generally designated as 40, is incorporated into the interior of earth imaging system 46. The radiometric calibration assembly may be moved into its calibration position by way of movable control mechanism 48.

After being moved into its calibration position, light 20 from the sun enters earth imaging system 46 when a shutter or door 44 is opened (there may also be a configuration with an open port without any door). Imaging system 46 (or remote sensor system 46) includes a sensor array (not shown), which may be accessed by sunlight 20 by way of the entrance port to the sensor array designated as 50. Light 20 encounters transmissive diffuser 10 which diffuses light 20 to form diffused light 22. The diffused light then impinges on reference radiometer 28. The diffused light is used for calibration purposes. Transmissive diffuser 10 is supported by frame 24, via wires 26, similarly to the configuration shown in FIG. 3A (the configuration shown in FIG. 3B may also be used).

It will be appreciated that an embodiment of this invention has been described in detail. Other variations may include the following: Most typically earth imaging system 46 may reside on a satellite or a drone. Other imaging systems may also use the described calibration hardware and methodology. For example, lunar based astronomical observatories and earth imagers may also benefit from using the transmissive diffuser of the present invention. Planetary imaging satellites also may benefit from the present invention.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A flux diffuser for radiometrically calibrating an imaging sensor using the sun as a calibration light source, the flux diffuser comprising
    a fiberglass cloth including input and output surfaces,
    the input surface receiving solar irradiance,
    the output surface providing diffused scattered light to a radiometer, and
    a layer of polytetrafluoroethylene (PTFE) disposed on top of the output surface.
2. The flux diffuser of claim 1 including
    a layer of polyester disposed on top of the input surface.
3. The flux diffuser of claim 1 including
    a layer of polyester disposed on top of the layer of PTFE.
4. The flux diffuser of claim 1 including
    a layer of polyester disposed on top of the input surface.
5. The flux diffuser of claim 1 wherein
    the fiberglass cloth is supported by a clear substrate.
6. The flux diffuser of claim 1 wherein
    the fiberglass cloth is supported by wires.
7. The flux diffuser of claim 1 including
    opposing tension rollers cooperating to support the fiberglass cloth.
8. The flux diffuser of claim 1 wherein
    the fiberglass cloth includes fiber that is regularly woven or randomly woven.
9. An optical system for calibrating an imaging sensor array using the sun as a calibration light source, comprising
    a port for viewing sunlight,
    an imaging sensor array for imaging a scene, and
    a flux diffuser, located between the port and the imaging sensor array, for illuminating the imaging sensor array with diffused sunlight,
    wherein the flux diffuser includes
    a fiberglass cloth including input and output surfaces,
    the input surface receiving sunlight,
    the output surface providing diffused scattered light to the imaging sensor array for radiometric calibration, and
    a layer of PTFE disposed on top of the output surface.
10. The optical system of claim 9 including
    a layer of polyester disposed on top of the input surface.
11. The optical system of claim 9 including
    a layer of polyester disposed on top of the output surface.
12. The optical system of claim 9 including
    a layer of polyester disposed on top of the input surface,
    a layer of PTFE disposed on top of the output surface, and
    a layer of polyester disposed on top of the layer of PTFE.
13. The optical system of claim 12 wherein
    the flux diffuser is configured to effectively diffuse the sunlight over a range of input sun angles.
14. The optical system of claim 12 wherein
    the layers of polyester are pressed onto respective surfaces of the fiberglass cloth for providing protective layers, and
    the layer of PTFE is provided as a thin layer of powder for binding the fiberglass cloth.
15. A method of calibrating an imaging sensor array using the sun as a calibration light source in an optical system, comprising the steps of:
    (a) receiving sunlight by an input surface of a fiberglass cloth;
    (b) diffusing the received sunlight;
    (c) outputting the diffused sunlight, from an output surface of the fiberglass cloth, to the imaging sensor array for radiometric calibration; and
    (d) binding the fiberglass cloth by adding a layer of PTFE onto a surface of the fiberglass cloth.
16. The method of claim 15 including the step of:
    protecting the input surface of the fiberglass cloth by adding a layer of polyester onto the fiberglass cloth.

* * * * *